US012286330B2

(12) United States Patent
Martins

(10) Patent No.: US 12,286,330 B2
(45) Date of Patent: Apr. 29, 2025

(54) ELEVATOR CONNECTOR WITH ANGLED INTERFACE

(71) Applicant: OTIS ELEVATOR COMPANY, Farmington, CT (US)

(72) Inventor: Antonio Martins, Vernon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/747,601

(22) Filed: Jun. 19, 2024

(65) Prior Publication Data

US 2025/0042695 A1 Feb. 6, 2025

Related U.S. Application Data

(63) Continuation of application No. 18/228,737, filed on Aug. 1, 2023, now Pat. No. 12,091,287.

(51) Int. Cl.

| | |
|---|---|
| ***B66B 7/08*** | (2006.01) |
| ***B66B 7/06*** | (2006.01) |
| ***B66B 7/12*** | (2006.01) |

(52) U.S. Cl.
CPC .............. *B66B 7/085* (2013.01); *B66B 7/062* (2013.01); *B66B 7/1223* (2013.01)

(58) Field of Classification Search
CPC .............................. B66B 7/085; B66B 7/1223
See application file for complete search history.

(56) References Cited

U.S. PATENT DOCUMENTS

| | | | | |
|---|---|---|---|---|
| 3,816,818 A * | 6/1974 | Meier | H01R 12/675 | 439/492 |
| 7,410,033 B2 * | 8/2008 | Veronesi | D07B 1/145 | 187/391 |
| 7,506,728 B2 * | 3/2009 | Hawkes | B66B 7/1223 | 187/277 |
| 7,540,359 B2 * | 6/2009 | Veronesi | H01R 12/62 | 187/247 |
| 8,640,828 B2 * | 2/2014 | Annen | H01R 12/592 | 340/677 |
| 8,991,562 B2 * | 3/2015 | Odermatt | B66B 7/062 | 187/393 |
| 9,245,985 B2 | 2/2016 | Nolting et al. | | |
| 9,254,985 B2 * | 2/2016 | Nolting | B66B 7/062 | |
| 9,385,447 B2 * | 7/2016 | Dold | B66B 7/1223 | |
| 11,174,126 B2 * | 11/2021 | Dold | H01R 4/2406 | |
| 11,634,302 B2 * | 4/2023 | Nolting | B66B 7/062 | 187/251 |
| 12,091,287 B1 * | 9/2024 | Martins | B66B 7/085 | |

(Continued)

*Primary Examiner* — Michael A Riegelman

(74) *Attorney, Agent, or Firm* — Carlson, Gaskey & Olds, P.C.

(57) ABSTRACT

A connector assembly includes a connector body and a suspension member. The suspension member extends along a center axis and comprises a plurality of tension members encased in a jacket. The suspension member has one end received within the connector body, and this one end has an end face extending at an angle relative to the center axis with ends of the plurality of tension members being exposed. A plurality of contact members are supported within the connector body, and each contact member contacts an exposed end face of at least one tension member to establish electrically conductive connections with the plurality of tension members.

17 Claims, 6 Drawing Sheets

(56) References Cited

U.S. PATENT DOCUMENTS

| | | | | |
|---|---|---|---|---|
| 2008/0190709 | A1* | 8/2008 | Hawkes | H01R 4/2404 187/392 |
| 2011/0220438 | A1* | 9/2011 | Annen | B66B 7/062 439/884 |
| 2013/0157497 | A1* | 6/2013 | Dold | H01R 12/00 439/413 |
| 2014/0182975 | A1* | 7/2014 | Ikonen | F16G 11/04 187/251 |
| 2014/0230194 | A1* | 8/2014 | Moeschen-Siekmann | F16G 3/00 24/115 H |
| 2015/0063415 | A1* | 3/2015 | Garfinkel | G01N 27/20 324/693 |
| 2016/0152445 | A1* | 6/2016 | Lehtinen | H01R 13/639 439/367 |
| 2016/0221796 | A1* | 8/2016 | Puranen | B66B 7/085 |
| 2017/0121149 | A1* | 5/2017 | Lehtinen | B66B 7/1223 |
| 2018/0162696 | A1* | 6/2018 | Dudde | B66B 9/00 |
| 2019/0352131 | A1* | 11/2019 | Dold | B66B 7/12 |
| 2020/0277162 | A1* | 9/2020 | Larboulette | B66B 7/1223 |
| 2021/0130134 | A1* | 5/2021 | Palazzola | B66B 7/085 |
| 2021/0198083 | A1* | 7/2021 | Dold | B66B 7/085 |
| 2021/0331897 | A1* | 10/2021 | Dudde | B66B 7/085 |
| 2022/0242697 | A1* | 8/2022 | Palazzola | B66B 7/1223 |
| 2023/0066078 | A1* | 3/2023 | Ge | B66B 7/1223 |
| 2023/0271808 | A1* | 8/2023 | Evert | B66B 7/1215 187/264 |
| 2025/0019206 | A1* | 1/2025 | Martin | B66B 19/02 |
| 2025/0042695 | A1* | 2/2025 | Martins | B66B 7/1223 |

* cited by examiner

ELEVATOR CONNECTOR WITH ANGLED INTERFACE

CROSS-REFERENCE TO RELATED APPLICATIONS

This application is a continuation of U.S. patent application Ser. No. 18/228,737 filed on Aug. 1, 2023, the entirety of which is herein incorporated by reference.

BACKGROUND

Elevator systems are in widespread use for carrying passengers between various levels in buildings, for example. Some elevator systems are traction-based in which a suspension assembly, sometimes referred to as roping, suspends the elevator car and a counterweight. The suspension assembly also facilitates movement of the elevator car when needed. Traditional suspension assemblies include round steel ropes. More recently, elevator systems have included other types of suspension members, such as flat belts or other types of ropes that have multiple steel cords encased in a compressible polymer jacket.

Traditional round steel ropes were typically inspected using a manual process including manually and visually observing the condition of the outer surfaces of the rope. Coated belts and other coated ropes cannot be inspected that way. Electrical inspection techniques have been developed that include applying electric current to at least some of the steel strands and measuring an electrical characteristic, such as resistance, to obtain information indicating a condition of the belt or coated rope. Connectors are used to connect the coated belts to a monitoring device. The connection should be secure and have a good connection interface.

SUMMARY

An illustrative example connector assembly includes: a connector body; a suspension member extending along a center axis and comprising a plurality of tension members encased in a jacket, the suspension member having one end received within the connector body, and wherein the one end has an end face extending at an angle relative to the center axis with ends of the plurality of tension members being exposed; and a plurality of contact members supported within the connector body, wherein each contact member contacts an exposed end face of at least one tension member to establish electrically conductive connections with the plurality of tension members.

In addition to one or more of the features described above, or as an alternative, the connector assembly includes at least one retention member extending through the connector body to prevent the suspension member from being removed from the connector body.

In addition to one or more of the features described above, or as an alternative, the at least one retention member comprises a plurality of retention pins that extend at an angle relative to the center axis and have distal ends that abut against an external surface of the jacket.

In addition to one or more of the features described above, or as an alternative, the center axis extends along a length of the suspension member, and the plurality of tension members comprise a plurality of cords that are spaced apart from each other across a width of the suspension member, and wherein exposed end faces of each cord have an elliptical shape.

In addition to one or more of the features described above, or as an alternative, an end face of the suspension member extends at approximately a 45 degree angle relative to the center axis.

In addition to one or more of the features described above, or as an alternative, the connector body includes an opening to receive the one end of the suspension member, and the connector assembly further includes a gasket that surrounds the suspension member at the opening.

In addition to one or more of the features described above, or as an alternative, the plurality of contact members comprise bridging pins that connect exposed end faces of adjacent pairs of tension members and output pins that engage connection tabs.

In addition to one or more of the features described above, or as an alternative, the connection tabs comprise at least a first connection tab and a second connection tab, and wherein the plurality of tension members comprise a first end cord and a second end cord with a plurality of additional cords between the first end cord and the second end cord, and wherein the first connection tab contacts at least one output pin associated with the first end cord and the second connection tab contacts at least one output pin associated with the second end cord.

In addition to one or more of the features described above, or as an alternative, the plurality of contact members are resiliently biased into engagement with exposed end faces of the plurality of tension members.

In addition to one or more of the features described above, or as an alternative, the connector assembly includes at least one connection tab received within the connector body, and wherein at least one contact member of the plurality of contact members extends at an angle relative to the center axis to electrically connect the exposed end face of at least one tension member and the at least one connection tab.

An illustrative example elevator system includes: an elevator car; at least one suspension member that supports the elevator car and facilitates movement of the elevator car, wherein the at least one suspension member extends along a center axis and comprising a plurality of tension members encased in a jacket; a connector to receive one end of the at least one suspension member, wherein the one end has a cut end face extending at an angle relative to the center axis with ends of the plurality of tension members being exposed at the cut end face; and a plurality of contact members supported within the connector, wherein each contact member contacts an exposed end face of at least one tension member to establish electrically conductive connections with the plurality of tension members.

In addition to one or more of the features described above, or as an alternative, the elevator system includes a plurality of retention pins extending through the connector to prevent the at least one suspension member from being removed from the connector, wherein the plurality of retention pins that extend at an angle relative to the center axis and have distal ends that abut against an external surface of the jacket.

In addition to one or more of the features described above, or as an alternative, the center axis extends along a length of the at least one suspension member, and the plurality of tension members comprise a plurality of cords that are spaced apart from each other across a width of the at least one suspension member, and wherein exposed end faces of each cord have an elliptical shape.

In addition to one or more of the features described above, or as an alternative, the connector includes an opening to receive the one end of the at least one suspension member, and the connector assembly further includes a gasket that surrounds the at least one suspension member at the opening.

In addition to one or more of the features described above, or as an alternative, the plurality of contact members comprise bridging pins that connect exposed end faces of adjacent pairs of tension members and output pins that engage connection tabs.

In addition to one or more of the features described above, or as an alternative, the connection tabs comprise at least a first connection tab and a second connection tab, and wherein the plurality of tension members comprise a first end cord and a second end cord with a plurality of additional cords between the first end cord and the second end cord, and wherein the first connection tab contacts at least one output pin associated with the first end cord and the second connection tab contacts at least one output pin associated with the second end cord.

In addition to one or more of the features described above, or as an alternative, the plurality of contact members are resiliently biased into engagement with exposed end faces of the plurality of tension members.

An illustrative example method includes: encasing a plurality of tension members in a jacket to form a suspension member that extends along a center axis; cutting one end of the suspension member at an angle relative to the center axis to expose ends of the plurality of tension members; inserting the one end of a suspension member into a connector body; and supporting a plurality of contact members within the connector body, each contact member contacting an exposed end face of at least one tension member to establish electrically conductive connections with the plurality of tension members.

In addition to one or more of the features described above, or as an alternative, the method further includes inserting a plurality of retention pins into the connector body to engage an external surface of the jacket to prevent the suspension member from being removed from the connector body.

In addition to one or more of the features described above, or as an alternative, the method further includes forming an opening in the connector body, inserting the one end of the suspension member into the opening, and installing a gasket to surround the suspension member at the opening.

The various features and advantages of an example embodiment will become apparent to those skilled in the art from the following detailed description. The drawings that accompany the detailed description can be briefly described as follows.

DETAILED DESCRIPTION

Embodiments of this disclosure provide a connector assembly that relies on contact pins contacting enlarged angular surfaces of tension members exposed at an end on a suspension member. This connection interface has increased contact area, is tolerant to a loose fit situation, reduces issues related to belt-to-connector tolerances, and is sealed to reduce environmental impacts on the connection.

Figure 1:
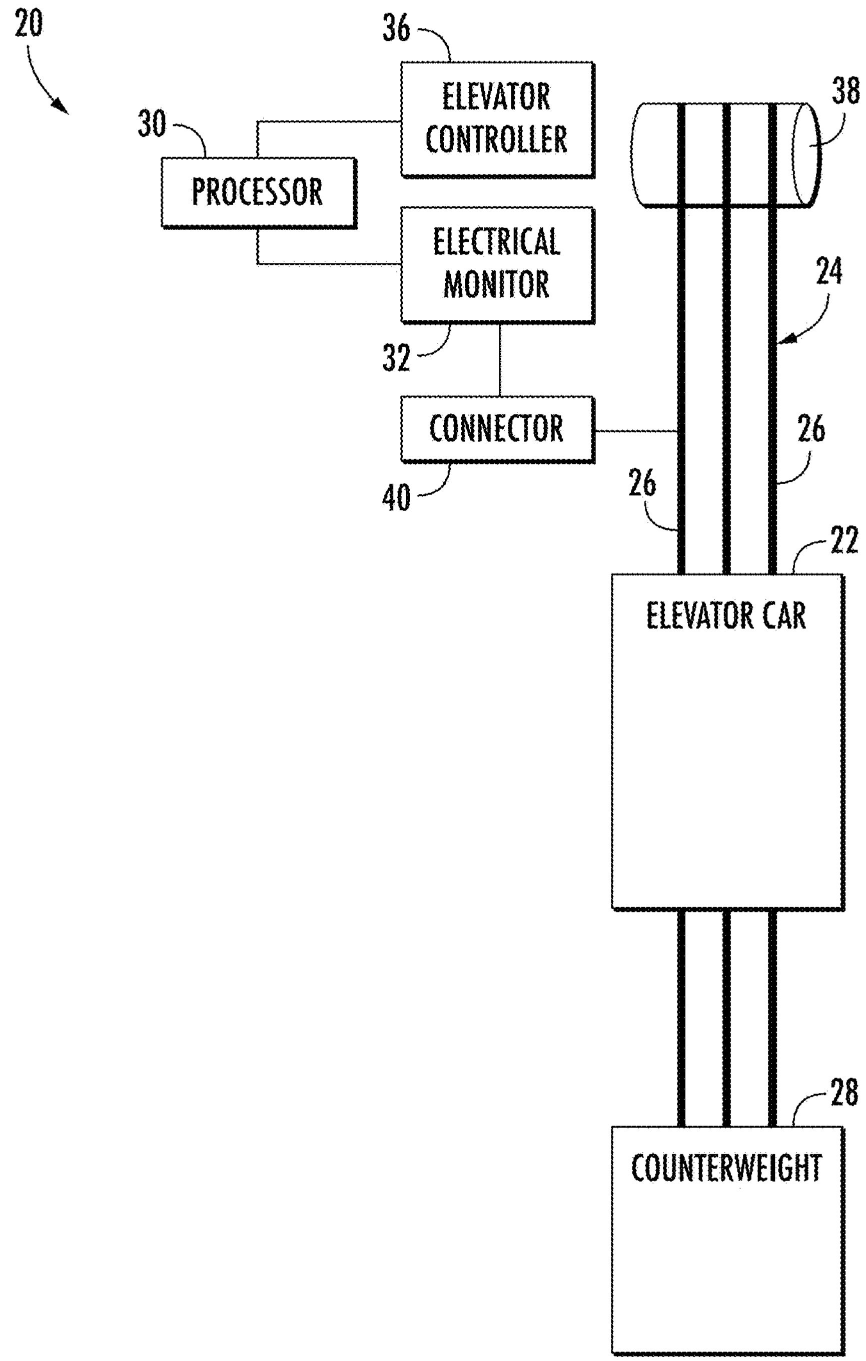
FIG. 1 schematically illustrates selected portions of an elevator system.

FIG. 1 schematically illustrates selected portions of an elevator system 20. An elevator car 22 is supported by a roping arrangement or suspension assembly 24 that includes a plurality of suspension members 26. The elevator car 22 is coupled to a counterweight 28 by the suspension members 26. The suspension members 26 move around a sheave 38 as the elevator car 22 moves between landings or levels.

A suspension member monitoring device includes at least one processor 30 that is configured to determine a condition of each of the suspension members 26. The processor 30 in the illustrated example includes a computing device and associated memory. The processor 30 is programmed or otherwise configured to use different types of information indicative of the respective conditions of the suspension members 26 and a combination of criteria to determine when it is desirable or necessary to remove any one of the suspension members 26 from service.

An electric-based monitor 32 uses an electrical inspection technique and generates or provides a corresponding indication regarding a condition of each suspension member 26. The processor 30 receives the indication from the electric-based monitor 32.

In some example embodiments, the electric-based monitor 32 is configured to apply electricity to at least one of the tension members, such as a steel cord, of each suspension member 26 and to detect or measure the electrical resistance of the tension member. Changes in the electrical resistance indicate changes in a condition of the suspension member 26. Such resistance-based inspection techniques are known and need not be further described here.

Figure 2:
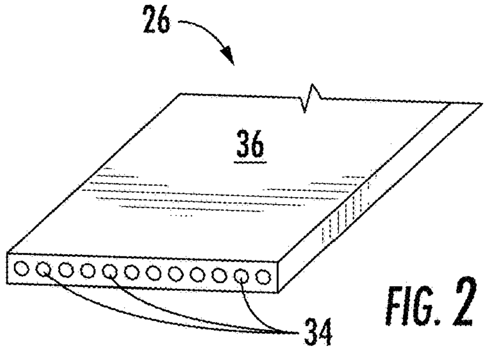
FIG. 2 schematically illustrates a portion of an example suspension member.

FIG. 2 schematically illustrates a portion of an example suspension member 26. In the illustrated embodiment, the suspension member 26 is a flat belt including a plurality of cords or tension members 34 encased in a jacket 36 of a compressible material, such as polyurethane. In many embodiments, the tension members 34 comprise steel cords. Other embodiments include tension members that are made of different materials. The electrical inspection technique takes advantage of the electrically conductive nature of the tension members 34.

A connector assembly 40 is used to connect the electric-based monitor 32 to an associated suspension member 26 (FIG. 1). In one example, the electric-based monitor 32 wirelessly communicates the electrical resistance information to the processor 30.

Figure 3:
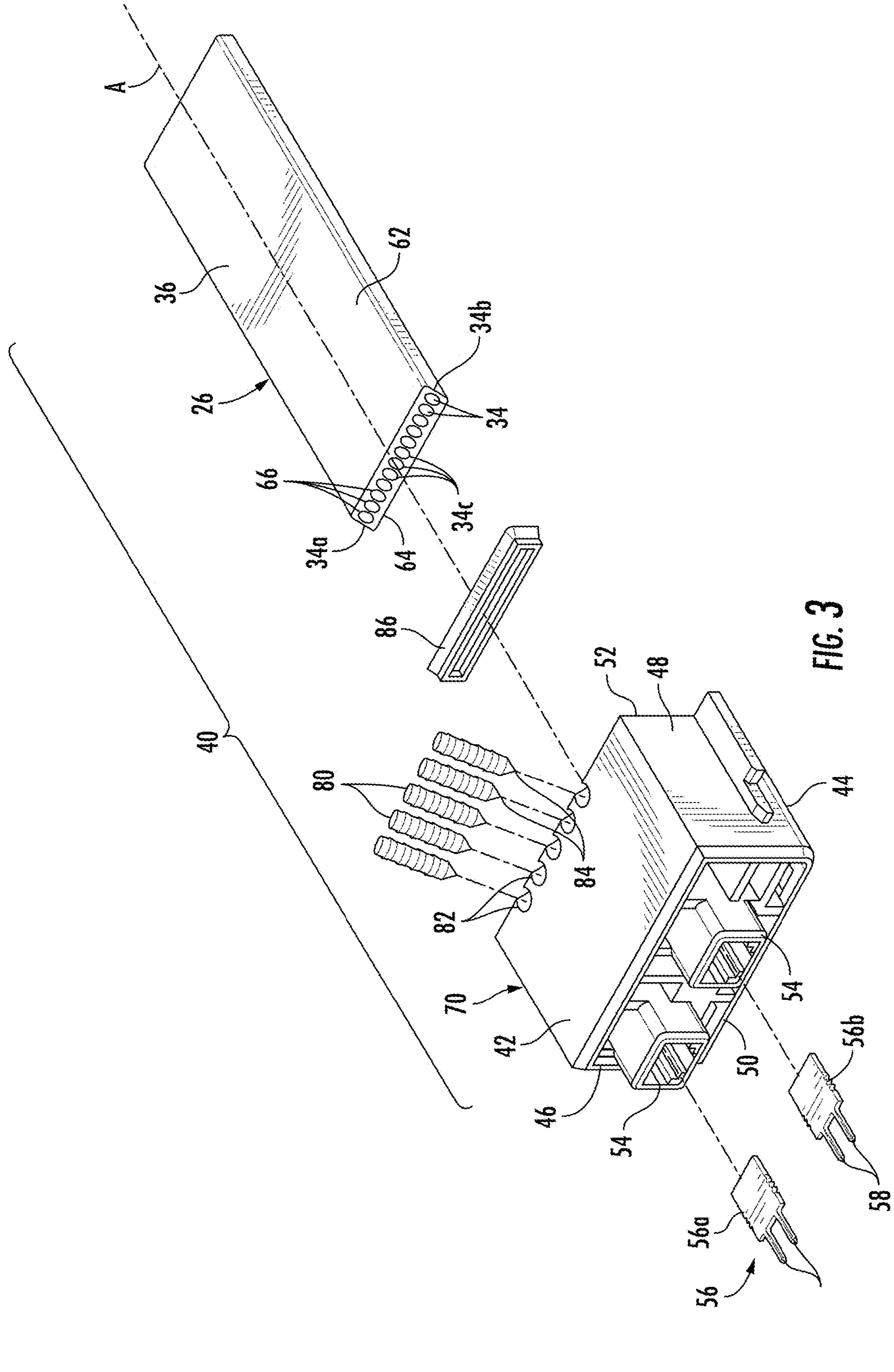
FIG. 3 is an exploded view of a connector assembly used to connect to a suspension member.
Figure 4:
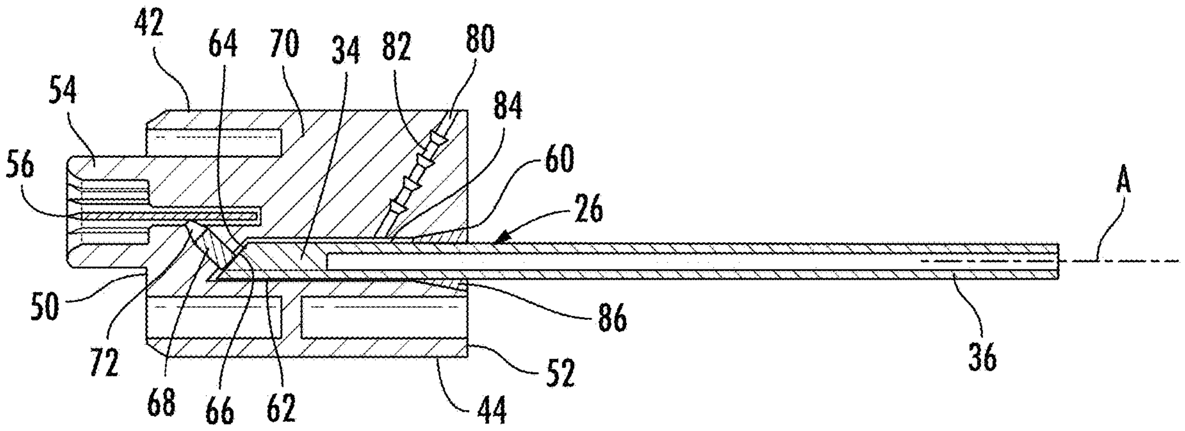
FIG. 4 is a section view of the connector assembly of FIG. 3 when assembled.

FIGS. 3-4 show one example of the connector assembly 40. The connector assembly 40 includes a connector body that has a first surface 42, a second surface 44 facing opposite of the first surface 42, and first 46 and second 48 side surfaces connecting the first surface 42 to the second surface 44. The connector assembly 40 further includes a forward end wall 50 and a rear end wall 52 facing opposite of the forward end wall 50. In one example, the forward end wall 50 includes one or more ports 54 that each receive a connection tab 56. The connection tab 56 includes prongs 58 that are used to connect to an associated connection interface for the electric-based monitor 32. In one example, the rear end wall 52 includes an opening 60 (FIG. 4) through which one end 62 of the suspension member 26 is inserted.

In one example, the suspension member 26 extends along a center axis A with the plurality of cords/tension members 34 being arranged in a row and spaced apart from each other in a direction that extends across the axis A (FIG. 3). The center axis A extends along a length of the suspension member 26 with the tension members 34 being spaced apart from each other across a width of the suspension member 26, the length being greater than the width. As best shown in FIG. 4, the suspension member 26 has one end 62 received within the opening 60 in the rear end wall 52, wherein the one end 62 has an end face 64 extending at an angle relative to the center axis A with ends of the plurality of tension members 34 being exposed. In one example, exposed end faces 66 of each tension member 34 extend at the same angle as the end face 64 of the suspension member 26.

In one example, the end face 64 comprises a cut end face that is cut at a predetermined angle to provide increased contact area for the exposed end faces 66. Those skilled in the art who have the benefit of this description will be able to determine how to cut the end of the suspension member to achieve the desired angle. In one example, the predetermined angle is approximately a 45 degree angle relative to the center axis A. In one example, cutting ends of the tension members 34 at an angle provides the exposed end faces 66 with an elliptical or oval shape; however, other shapes could also be utilized to provide a desired contact area size/shape.

In one example, the connector assembly 40 includes a plurality of contact members 68 that are supported within a body 70 of the connector assembly 40. In one example, each contact member 68 contacts an exposed end face 66 of at least one tension member 34 to establish electrically conductive connections with the plurality of tension members 34. In one example, the plurality of contact members 68 are resiliently biased into engagement with exposed end faces 66 of the plurality of tension members 34. In one example, springs 72 are associated with the contact members 68 as shown in FIG. 4.

Figure 5A:
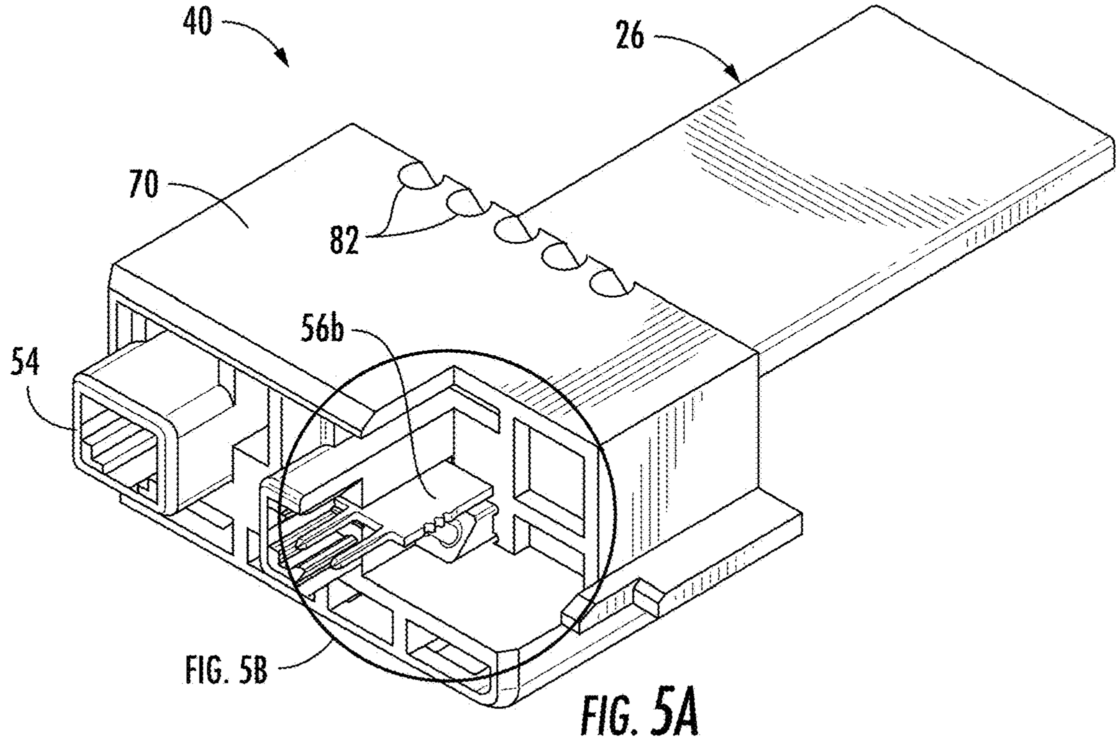
FIG. 5A is a perspective view of the connector assembly of FIG. 4, and which is partially cut-away to show a connection interface for a connection tab, contact pin, and cord/tension member.
Figure 5B:
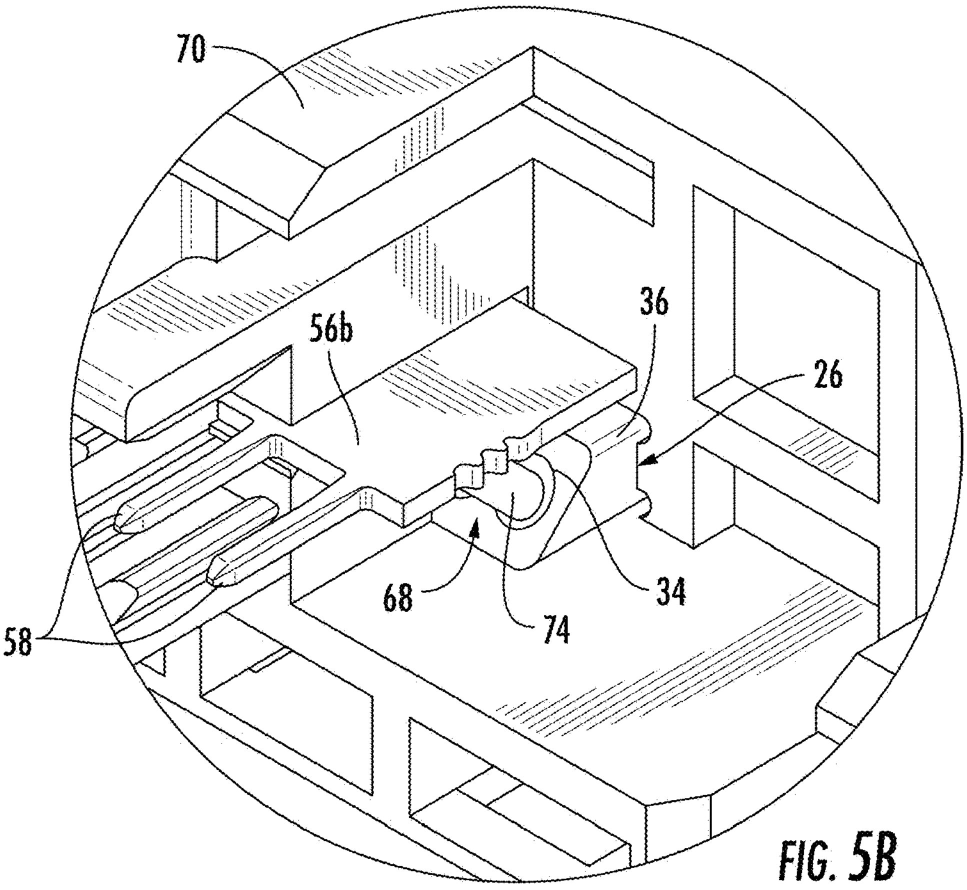
FIG. 5B is an enlarged detail as identified in FIG. 5A.
Figure 6:
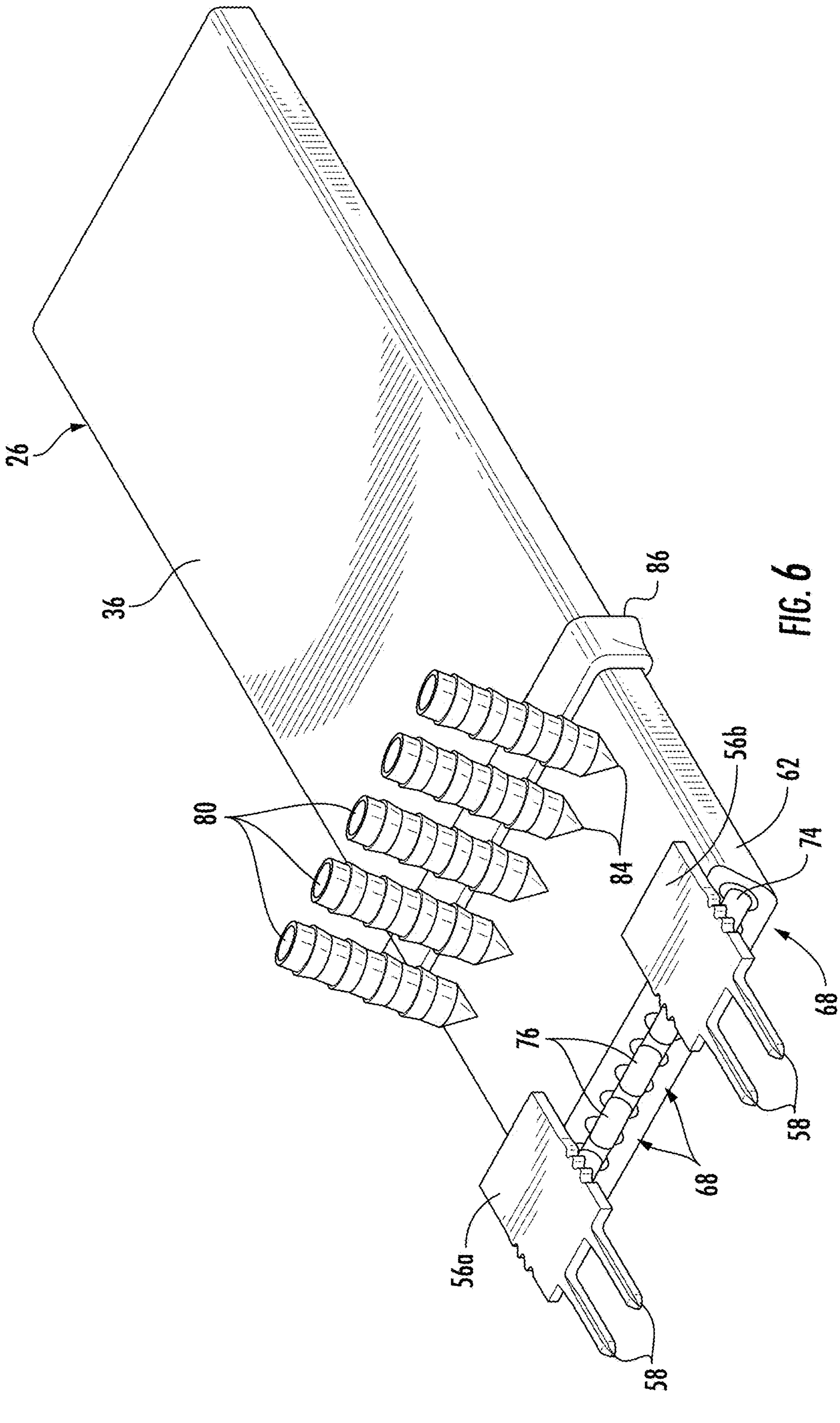
FIG. 6 is a perspective view of the connector assembly without showing a connector body.

In one example, there are at least two different types of contact members 68. In one example, some of the contact members 68 comprise output pins 74 that engage connection tabs 56 as shown in FIGS. 5A-5B, while other contact members 68 comprise bridging pins 76 that connect the exposed end faces 66 of adjacent pairs of tension members 34 as shown in FIG. 6. In one example, the connection tabs 56 comprise at least a first connection tab **56*a* and a second connection tab 56*b*, and the plurality of tension members 34 comprise a first end cord 34*a* and a second end cord 34*b* with a plurality of additional cords 34*c* between the first end cord 34*a* and the second end cord 34*b* as shown in FIG. 3. In one example, the first connection tab 56*a* contacts the output pin 74 associated with the first end cord 34*a* and the second connection tab 56*b* contacts the output pin 74 associated with the second end cord 34*b* as shown in FIGS. 5B and 6. This allows for the establishment electrically conductive connections with the plurality of tension members 34**.

In one example, one or more retention members 80 are used to prevent the suspension member 26 from being removed from the connector body 70 and to provide a mechanical load against the electrical contact pins 68. In one example, the connector body 70 includes slots or openings 82 that receive the retention members 80 such that the retention members 80 extend through the connector body 70.

In one example, the retention members comprise a plurality of retention pins that extend at an angle relative to the center axis A and have distal ends 84 that abut directly against an external surface of the jacket 36 as shown in FIG. 6.

As discussed above, the connector body 70 includes an opening 60 that receives one end 62 of the suspension member 26 In one example, a gasket 86 is installed within the connector body 70. In one example, the gasket 86 completely surrounds the suspension member 26 at the opening 62. This provides a sealed interface at this location and minimizes environmental degradation at a contact area between the exposed end faces 66 and the contact members 68.

In one example, the connection tabs 56 are received within the ports 54 of the connector body 70 and are orientated generally parallel to the suspension member 26 and center axis A. In one example, the output pins 74 of the contact members 68 extend at an angle relative to the center axis A to electrically connect the exposed end faces 66 of the tension members 34 and the connection tabs 56. In one example, this angle is acute or obtuse to the center axis. In one example, the bridging pins 76 of the contact members 68 also extend at an acute or obtuse angle relative to the center axis A. In one example, the retention members 80 extend at an acute or obtuse angle relative to the center axis A.

Figure 7:
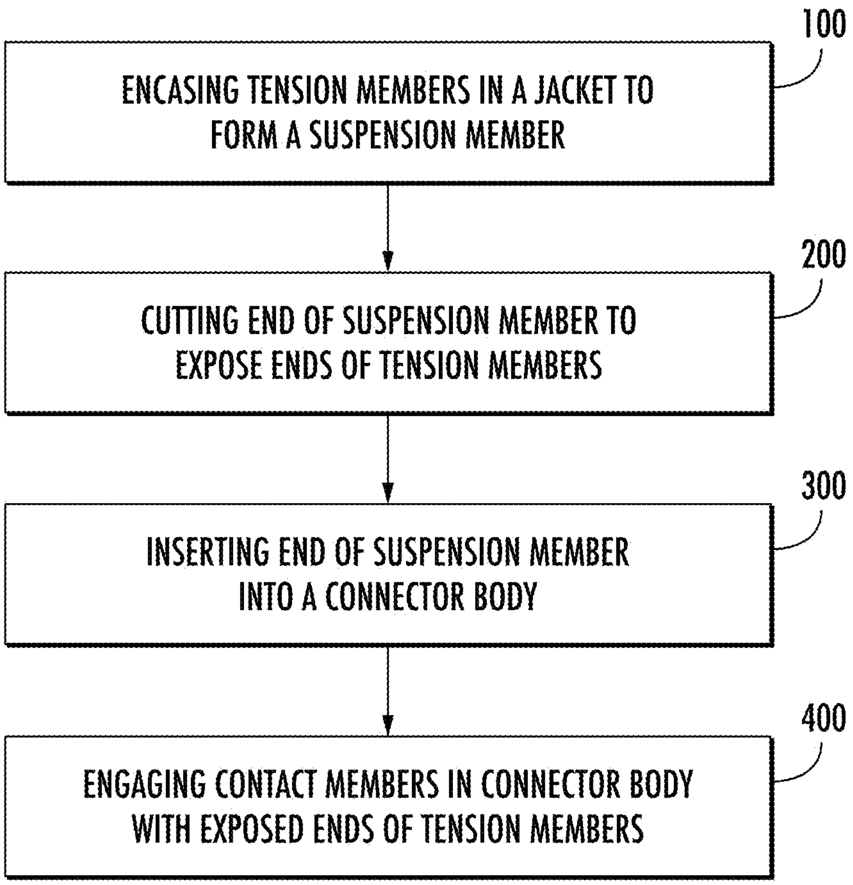
FIG. 7 is a flowchart diagram of an example implementation of a method of using a connector assembly to establish electrically conductive connections with a plurality of tension members.

FIG. 7 is a flowchart diagram of an example implementation of a method of using a connector assembly 40 to establish electrically conductive connections with a plurality of tension members 34. At step 100, the method includes encasing a plurality of tension members 34 in a jacket 36 to form a suspension member 26 that extends along a center axis A. Next, at step 200, the method includes cutting one end 62 of the suspension member 26 at an angle relative to the center axis A to expose ends of the plurality of tension members 34. At step 300, the method includes inserting the one end 62 of the suspension member 26 into a connector body 70. Finally, at step 400, the method includes supporting a plurality of contact members 68 within the connector body 70, each contact member 68 contacting an exposed end face 66 of one tension member 34 to establish electrically conductive connections with the plurality of tension members 34.

Additional steps can include inserting a plurality of retention pins 80 into the connector body 70 to engage an external surface of the jacket 36 to prevent the suspension member 26 from being removed from the connector body 70, and/or forming an opening 60 in the connector body 70, inserting the one end 62 of the suspension member 26 into the opening 60, and installing a gasket 86 to surround the suspension member 26 at the opening 60.

The subject disclosure provides a connector assembly that is compatible with existing Resistance Belt Inspection (RBI) systems. The interface to the RBI module remains unchanged; however, the interface to the suspension member relies on contact pins contacting an enlarged angular surface at the end of the suspension member. In one example, the suspension member is prepared with angular cut, e.g. approximately a 45° cut. By cutting the suspension member at an angle, a larger conic shaped area of the cord/tension member will be exposed, thereby reducing the required precision of the connector. Angled, spring-loaded contact pins contact the exposed belt cords of the suspension member. The subject disclosure utilizes two types of contact pins, including bridging pins to connect adjacent cord pairs and output pins to connect to the connection tabs. This connection interface of the subject disclosure has increased contact area, is tolerant to a loose fit circumstance, reduces issues related to belt-to-connector tolerances, and is sealed to reduce environmental impacts on the connection.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A connector assembly comprising:

a connector body;

at least one tension member encased in a jacket, the at least one tension member having one end received in the connector body and an exposed end face extending at an angle relative to a center axis of the jacket; and at least one contact member supported within the connector body, the at least one contact member in contact with the exposed end face of the at least one tension member to establish an electrically conductive connection with the at least one tension member.

2. The connector assembly of claim 1, including at least one retention member extending through the connector body to prevent the at least one tension member from being removed from the connector body.

3. The connector assembly of claim 1, wherein the exposed end face has an elliptical shape.

4. The connector assembly of claim 1, wherein the exposed end face of the at least one tension member extends at approximately a 45 degree angle relative to the center axis.

5. The connector assembly of claim 1, wherein the at least one contact member is resiliently biased into engagement with the exposed end face of the at least one tension member.

6. The connector assembly of claim 1, including at least one connection tab received within the connector body, and wherein the at least one contact member extends at an angle relative to the center axis to electrically connect the exposed end face of the at least one tension member and the at least one connection tab.

7. The connector assembly of claim 1, wherein the at least one tension member comprises a plurality of tension members encased in the jacket, and wherein the jacket has one end received within the connector body, and wherein the one end of the jacket has an end face extending at an angle relative to the center axis with ends of the plurality of tension members being exposed.

8. The connector assembly of claim 7, wherein the at least one contact member comprises a plurality of contact members supported within the connector body, and wherein each contact member contacts the exposed end face of a corresponding tension member to establish electrically conductive connections with the plurality of tension members.

9. The connector assembly of claim 8, wherein the plurality of contact members comprises a plurality of bridging pins that connect exposed end faces of adjacent pairs of tension members and a plurality of output pins that engage connection tabs.

10. The connector assembly of claim 9, wherein the connection tabs comprise at least a first connection tab and a second connection tab, and wherein the plurality of tension members comprise a first end cord and a second end cord with a plurality of additional cords between the first end cord and the second end cord, and wherein:

the first connection tab contacts at least one output pin associated with the first end cord;

the second connection tab contacts at least one output pin associated with the second end cord; and at least one bridging pin of the plurality of bridging pins connect exposed end faces of adjacent pairs of the plurality of additional cords between the first end cord and the second end cord.

11. An elevator system, comprising:

an elevator car;

at least one belt supporting the elevator car, the at least one belt comprising a jacket encasing at least one tension member;

a connector body that receives one end of the jacket, the at least one tension member having an exposed end face extending at an angle relative to a center axis of the jacket; and at least one contact member supported within the connector body, the at least one contact member in contact with the exposed end face of the at least one tension member to establish an electrically conductive connection with the at least one tension member.

12. The elevator system of claim 11, including at least one retention pin associated with the connector body to prevent the jacket from being removed from the connector body.

13. The elevator system of claim 11, wherein the exposed end face of the at least one tension member has an elliptical shape.

14. The elevator system of claim 11, wherein the at least one tension member comprises a plurality of tension members encased in the jacket, and wherein the one end of the jacket has an end face extending at an angle relative to the center axis with exposed end faces of the plurality of tension members being axially along the end face of the jacket.

15. The elevator system of claim 14, wherein the at least one contact member comprises a plurality of contact members supported within the connector body, and wherein each contact member contacts the exposed end face of a corresponding tension member to establish electrically conductive connections with the plurality of tension members.

16. The elevator system of claim 15, wherein the plurality of contact members comprise bridging pins that connect exposed end faces of adjacent pairs of tension members and output pins that engage connection tabs.

17. The elevator system of claim 15, wherein the plurality of contact members are resiliently biased into engagement with the exposed end faces of the plurality of tension members.

* * * * *